Patented June 28, 1927.

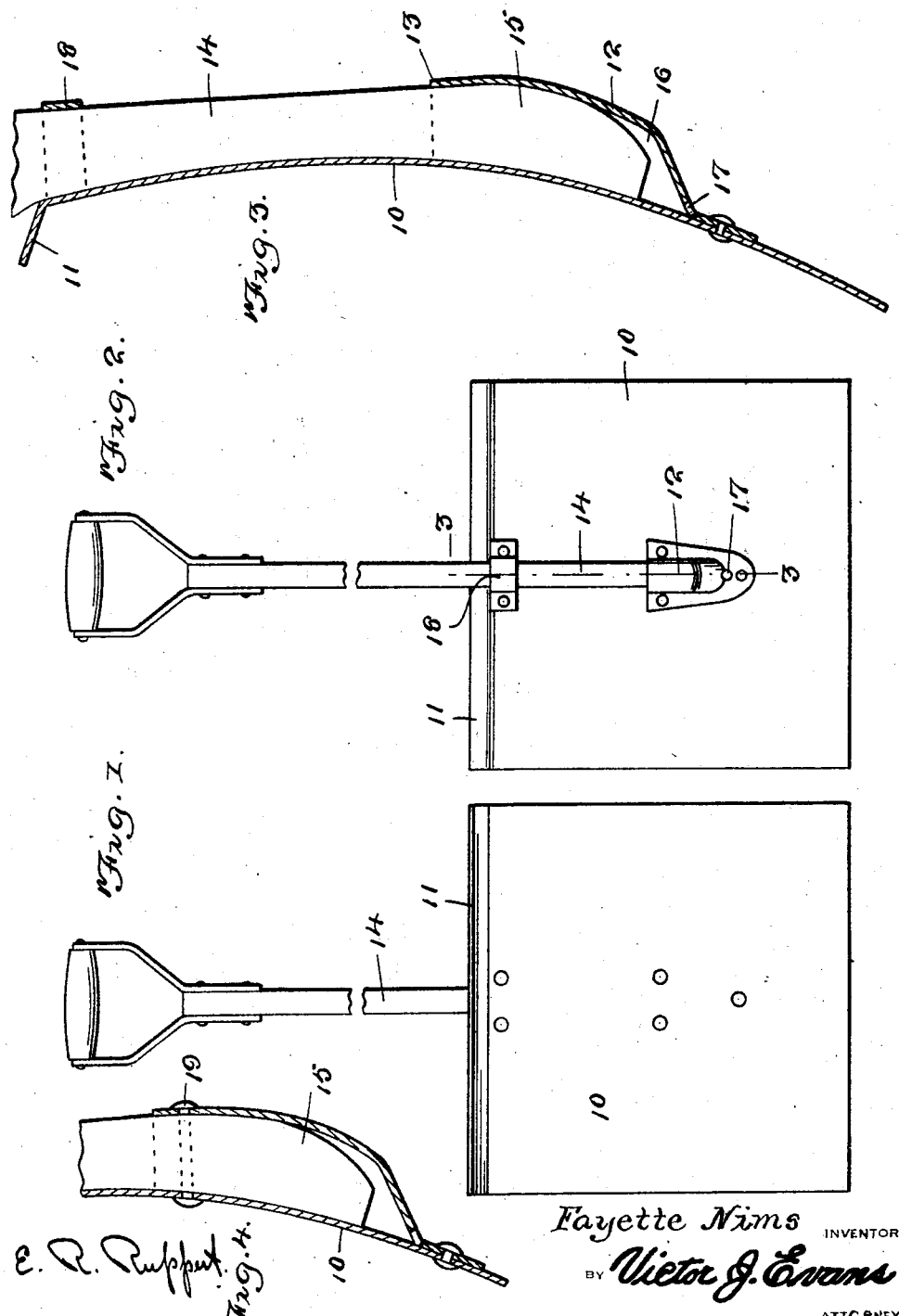

1,634,204

UNITED STATES PATENT OFFICE.

FAYETTE NIMS, OF MONTOUR FALLS, NEW YORK.

SNOW SHOVEL.

Application filed February 24, 1926. Serial No. 90,389.

This invention relates to snow shovels or pushers and has for an object the provision of an implement of this character which may be made of relatively light spring metal and shaped to prevent the ice and snow from passing over the top of the shovel blade, the means provided for this purpose also forming blade reinforcing means.

Another object of the invention is the provision of novel means as a handle lock for securely attaching the handle to the blade and for preventing the collection of water or moisture in the handle attaching means so as to prevent the handle from rotting.

With the above and other objects in view, the invention further includes the following novel features and details of construction, to be hereinafter more fully described, illustrated in the accompanying drawings and pointed out in the appended claims.

In the drawings:—

Figure 1 is a front elevation of a snow shovel or pusher constructed in accordance with the invention.

Figure 2 is a rear view of the same.

Figure 3 is an enlarged sectional view taken substantially on the line 3—3 of Figure 2.

Figure 4 is a fragmentary section somewhat similar to Figure 3 but showing additional securing means for the handle.

Referring to the drawings in detail wherein like characters of reference denote corresponding parts, the blade of the shovel which is indicated at 10 is preferably formed of relatively light spring metal and is curved from its lower to its upper edge, or in the direction of length of the handle. The upper edge of the blade is bent at an obtuse angle and extends outwardly or away from the handle so as to provide a flange 11. This flange reinforces or stiffens the upper part of the blade and in addition prevents the ice and snow from passing over the top. This is due to the particular angle and flat shape of the flange which directs the snow and ice outward or forward at an easy angle and prevents any tendency of the snow or ice to pack along the upper edge of the shovel.

Secured to the back of the shovel at a point below the center thereof is a socket 12. The outer wall of this socket is of a slightly different curvature than the curvature of the shovel blade and provides an open upper end 13 whose area is less than the cross sectional area of the socket at a point spaced inward from the opening. This socket receives the end of a handle 14 which is shaped adjacent its end to provide an enlarged or head-like portion 15, while the extremity of the handle is reduced and terminates short of the inclined bottom of the socket so as to provide an air space 16. As will be seen from Figure 3 of the drawings, the major portion of the end of the handle is in close contact with the walls of the socket except where it is spaced to provide the air space 16. The lower part of the socket is provided with a drain opening 17, so that snow or water may be prevented from collecting in the socket, while the entrance of air and its circulation within the air space permits the end of the handle to dry and thus prevents rotting.

The handle 14 is engaged by a strap or loop 18, the latter extending around the handle near the upper edge of the blade and having its opposite ends secured to the blade.

In Figure 4, there is provided a fastening device or rivet 19 which extends through the handle and socket and assists in holding the handle in place.

The invention is susceptible of various changes in its form, proportions and minor details of construction and the right is herein reserved to make such changes as properly fall within the scope of the appended claims.

Having described the invention what is claimed is:—

1. In a snow shovel, a blade curved from its lower to its upper edge, a handle socket attached to and extending down the back of the blade below the center thereof and opening upwardly, the outer wall of the socket having a curve slightly different from the curve of the blade and providing an opening of less area than the cross sectional area of the socket, a handle shaped adjacent its lower end to conform to the shape of the socket and providing a head-like portion to engage the walls of the socket and a strap near the upper edge of the blade around the handle which acts as a handle lock.

2. In a snow shovel, a blade curved from its lower to its upper edge, a handle socket attached to and extending down the back of the blade below the center thereof and opening upwardly, the outer wall of the socket having a curve slightly different from the curve of the blade and providing an opening of less area than the cross sectional area of the socket, a handle shaped adjacent its lower end to conform to the shape of the socket and providing a head-like portion to engage the walls of the socket with the extremity of the handle reduced and terminating short of the bottom of the socket to provide an air space and said socket having a drain opening in its lower end and a strap near the upper edge of the blade around the handle.

In testimony whereof I affix my signature.

FAYETTE NIMS.